United States Patent [19]

Schapira et al.

[11] Patent Number: 5,372,748

[45] Date of Patent: Dec. 13, 1994

[54] AGENT INHIBITING THE CORROSIVE CHARACTERISTICS OF NITROGENOUS FERTILIZING SOLUTIONS, PROCESS USING THE SAID AGENT AND NITROGENOUS FERTILIZING SOLUTIONS CONTAINING THE SAID AGENT

[75] Inventors: Joseph Schapira, Paris; Jean-Claude Cheminaud, Herblay; Pascal Petitbon, Gennevilliers; Dominique Imbert, Courbevoie, all of France

[73] Assignee: CFPI, France

[21] Appl. No.: 43,866

[22] Filed: Apr. 7, 1993

[30] Foreign Application Priority Data

Apr. 7, 1992 [FR] France .................. 92 04236

[51] Int. Cl.$^5$ ........................... C23F 11/167
[52] U.S. Cl. ..................... 252/389.23; 71/27; 71/28; 71/29; 422/18
[58] Field of Search .................. 71/27, 28, 29; 252/389.23; 422/18

[56] References Cited

U.S. PATENT DOCUMENTS

| | | | |
|---|---|---|---|
| 3,607,757 | 7/1968 | McDonald | 252/75 |
| 3,991,116 | 11/1976 | Damiano | 564/441 |
| 4,657,581 | 4/1987 | Takematsu et al. | 504/336 |
| 4,987,145 | 1/1991 | Kisida | 514/394 |

OTHER PUBLICATIONS

Database WPIL–Section Ch, Week 9015 Derwent Publications Ltd, London NL–A–8 901 407 (Zent Inst Chimitsch) Jan. 2. 1991 Derwent Abstract only.

*Primary Examiner*—Robert L. Stoll
*Assistant Examiner*—Valerie Fee
*Attorney, Agent, or Firm*—Larson and Taylor

[57] ABSTRACT

Process for inhibiting the corrosive characteristics of a nitrogenous fertilizing solution comprising incorporating in said nitrogenous fertilizing solution at the moment of its constitution, about 50 to about 150 ppm of at least one of the linear esters of acid phosphates having the formulae;

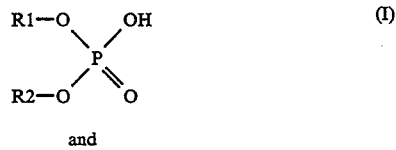

(I)

and

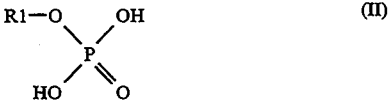

(II)

wherein R1 and R2 which are identical or different from one another, are selected from the group consisting of the n-heptyl, n-octyl, n-nonyl and n-decyl radicals.

9 Claims, No Drawings

AGENT INHIBITING THE CORROSIVE CHARACTERISTICS OF NITROGENOUS FERTILIZING SOLUTIONS, PROCESS USING THE SAID AGENT AND NITROGENOUS FERTILIZING SOLUTIONS CONTAINING THE SAID AGENT

The invention relates to an agent inhibiting the corrosive characteristics of nitrogenous fertilizing solutions as well as to a process using the said agent.

It also relates to the use of the said agent in order to inhibit the corrosive characteristics of nitrogenous fertilizing solutions.

It relates finally, as new industrial products, to nitrogenous fertilizing solutions comprising the abovesaid agent.

The nitrogenous fertilizing solutions, i.e. the aqueous solutions of ammonium nitrate, of ammonium sulfate, of ammonium phosphate and of the mixture of these products as well as the nitrogenous solutions containing urea have well-known corrosive characteristics which are very disturbing with respect to iron and to its alloys, in other words with respect to the metal which is the essential constituent of production, storage, transportation and handling outfits for the solutions in question.

Consequently, a permanent concern of the manufacturers and the users of the said solutions is to find the most efficient means for inhibiting the said characteristics.

And as a matter of fact a great number of products corresponding this concern have been proposed.

Among these products, it is possible to mention certain phosphate esters.

In that connection,
- the DD No. 271,900 discloses tests using in combination mono- and dialkyl (branched $C_7$ and $C_8$ radicals) acid phosphates, an acid alcohol sulfate and a sodium soap;
- the european patent EP 39 314 discloses the use of diesters of ethoxylated acid phosphates and
- the dutch patent NL 8901407 discloses the use of ethoxylated mono- and diethylhexyl phosphates and of their salts.

The efficiency of these compounds is satisfying but not sufficient to prevent the formation of important amounts of insoluble deposits, i.e. of rust, which provide the fertilizing solutions with unpleasant aspect and consistency.

Consequently, the object of the invention is above all to eliminate these drawbacks and to improve decisively the inhibition of the corrosive characteristics of nitrogenous fertilizing solutions and thus to have limpid fertilizing solutions even after a prolonged storage.

And the Applicants had the merit of finding that this result is reached as soon as use is made to fight again corrosion in nitrogenous fertilizing solutions of at least one of the linear esters of acid phosphates having the formulae:

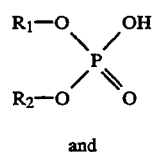

and

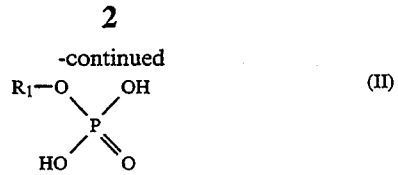

wherein $R_1$ and $R_2$ which may be identical or different from one another, are selected from the group consisting of the n-heptyl, n-octyl, n-nonyl and n-decyl radicals or to the alkaline salts of these esters.

Consequently, the agent inhibiting the corrosive characteristics of nitrogenous fertilizing solutions is consisting of at least one of the linear esters of acid phosphates corresponding to the formulas (I) and (II) and the alkaline salts of these esters.

The process according to the invention is characterized by the fact that an efficient amount, preferably from about 50 to about 150 ppm of at least one of the abovesaid linear esters of acid phosphates, possibly in the form of the alkaline salt, is incorporated to a nitrogenous fertilizing solution, preferably at the moment of the constitution of the said solution.

The addition of the abovesaid ester can be carried out in one time or in several times. In particular, in the case of a dynamic storage wherein the level of the storage vessels is replenished with nitrogenous fertilizing solution, the said ester is introduced in an amount sufficient to maintain its concentration invariable.

The nitrogenous fertilizing solution according to the invention is characterized by the fact that it comprises an efficient amount, preferably from about 50 to about 150 ppm of the above-mentioned ester.

While it is possible to use the ester in the form of one of its alkaline salts—which may be formed in situ within the nitrogenous fertilizing solution which is being treated—, it is preferable to use the ester of acid phosphate as such due to the fact that the alkaline salts are becoming less and less soluble when the length of the alkyl chain increases; thus, for example, the sodium salt of the alkylphosphate in linear $C_{10}$ is very few soluble in water at a concentration of only a few percent by weight.

In order to prepare the ester of formula (I) or (II), it is possible to resort, for example, to the direct reaction between phosphoric anhydride and the selected alcohol at an appropriate temperature. The reaction provides generally mixtures of mono- and diesters whose relative proportions depend from the amount of phosphoric anhydride used.

2 to 4 moles, preferably 3 moles of linear alcohol in $C_7$ to $C_{10}$ are reacted with 1 mole of phosphoric anhydride.

The mixture of mono- and diester thus obtained comprises from 80% to 20% of the first and from 20% to 80% of the second; in the case where the molar ratio alcohol/$P_2O_5$ is equal to 3, the mixture of mono- and of diester comprises 50% from one and from the other.

The invention will be well understood with the help of the non-limiting and partially comparative examples which follow and wherein advantageous embodiments of the invention are disclosed.

In these examples, a nitrogenous fertilizing solution is used which comprises:
- ammonium nitrate in an amount of 426 g per kg of solution and
- urea in an amount of 424 g per kg of solution, the pH of this solution being equal to 5.5.

The tests carried out in connection with the said examples are carried out on metallic plates having a surface equal to 40 cm² and consisting of previously degreased normal cold rolled steel.

The test protocol is consisting in the evaluation of the loss of weight (g/m²) of the said plates, 80% of the surface of which being immersed in 200 g of the nitrogenous fertilizing solution.

To this nitrogenous fertilizing solution is incorporated—except as far as the control tests are concerned—an agent inhibiting corrosion.

The tests are carried out within stopped glass flasks which are put in an oven at 55° C. during 72 hours.

The result which is taken into consideration as the average value of the weight losses of five plates immersed within different flasks containing each 200 g of the nitrogenous solution.

The esters of acid phosphates according to the invention as well as the esters of the prior art which are tested in comparative tests are prepared by reaction of the phosphoric anhydride on the alcohol at a temperature of about 80° C., the duration of the reaction being equal to 3 hours.

The amount of alkylphosphate according to the invention or to the prior art which is used in the nitrogenous fertilizing solution is expressed in ppm with respect to the said nitrogenous solution.

For each test, there is also indicated the molar ratio alcohol/$P_2O_5$ which provides information concerning the preparation and the composition of the mixture of esters which is obtained.

EXAMPLE 1

In this example, determination was made with respect for the four esters of acid phosphate according to the invention as well as for a mixture of two of them, of their ability to inhibit the corrosive characteristics of the nitrogenous fertilizing solution above defined.

These results are collected in Table I.

For the sake of comparison, the same tests were carried out with four esters of phosphate according to the prior art wherein the alcohol either has a chain length lower than $C_7$, or is branched.

These results are collected in Table II.

Still for the sake of control, the corrosion of the same plates of steel subjected to the same nitrogenous solution, under the same conditions and in the absence of any inhibiting agent, has been studied.

In the case of this last test, the weight loss of the steel plates is 430 g/m².

This result is to be compared with those collected in Tables I and II, i.e.:

TABLE I

| DOSE (in ppm) | Nature of the alcohol of the ester of acid phosphate used according to the invention | Molar ratio alcohol/$P_2O_5$ | Loss of weight in 72 h. (in g/m²) |
| --- | --- | --- | --- |
| 100 | n-heptanol | 3 | 3.6 |
| 100 | n-octanol | 3 | 1.3 |
| 100 | n-nonanol | 3 | 2.2 |
| 100 | n-decanol | 3 | 3.2 |
| 100 | n-octanol 70% / n-décanol 30% | 3 | 2.5 |

TABLE II

| DOSE (in ppm) | Nature of the alcohol of the ester of acid phosphate used according to the prior art | Molar ratio alcohol/$P_2O_5$ | Loss of weight in 72 h. (in g/m²) |
| --- | --- | --- | --- |
| 100 | n-hexanol | 3 | 303 |
| 100 | ethyl-2-hexanol | 3 | 150 |
| 100 | octanol-2 | 3 | 150 |
| 100 | 3,7-dimethyl octanol-1 | 3 | 225 |

It appears from Tables I and II that, while the inhibiting agents according to the prior art present a non negligible efficiency, the efficiency obtained with the esters of acid phosphates according to the invention is at least forty times higher.

EXAMPLE 2

This example was carried out to determine the best ratio alcohol/$P_2O_5$ for the preparation of the ester of acid phosphate constituting the agent according to the invention.

Tests analogous to those of example 1 were carried out using two of the agents according to the invention (the alcohol being n-octanol and n-heptanol), the above-mentioned ratio being given several values.

The results are collected in Table III.

A control test carried out in the same manner as in example 1 provided a loss of weight of 450 g/m².

TABLE III

| DOSE (in ppm) | Nature of the alcohol of the ester of acid phosphate used according to the invention | Molar ratio alcohol/$P_2O_5$ | Loss of weight in 72 h. (in g/m²) |
| --- | --- | --- | --- |
| 100 | n-octanol | 2 | 91 |
| 100 | n-octanol | 3 | 1.3 |
| 100 | n-octanol | 4 | 100 |
| 100 | n-heptanol | 2 | 112 |
| 100 | n-heptanol | 3 | 3.6 |
| 100 | n-heptanol | 4 | 105 |

It clearly appears that preferably a ratio alcohol/$P_2O_5$ close to 3 should be used.

EXAMPLE 3

This example was carried out to determine the optimal dose of agent according to the invention in the nitrogenous fertilizing solution.

Consequently, tests were carried out under the same conditions as in example 1, the dose (expressed in ppm) of agent according to the invention being given several values.

A control test carried out according to the manner disclosed in example 1 has provided a loss of weight of 461 g/m².

The results thus obtained are collected in Table IV.

TABLE IV

| DOSE (in ppm) | Nature of the alcohol of the ester of acid phosphate used according to the invention | Molar ratio alcohol/$P_2O_5$ | Loss of weight in 72 h (in g/m²) |
| --- | --- | --- | --- |
| 50 | n-octanol | 3 | 120 |
| 100 | n-octanol | 3 | 1.3 |

TABLE IV-continued

| DOSE (in ppm) | Nature of the alcohol of the ester of acid phosphate used according to the invention | Molar ratio alcohol/P2O5 | Loss of weight in 72 h (in g/m²) |
|---|---|---|---|
| 150 | n-octanol | 3 | 1.2 |
| 50 | n-heptanol | 3 | 135 |
| 100 | n-heptanol | 3 | 3.6 |
| 150 | n-heptanol | 3 | 1.3 |

It clearly appears from Table IV that preferably the dose of agent according to the invention is selected close to 100 ppm as for higher values the gain is minor.

EXAMPLE 4

The tests are carried out in this example are intended to determine whether it is more advantageous to use the agent according to the invention in the form of the ester of acid phosphate or in the form of an alkaline salt.

The tests carried out under the conditions of example 1 at two doses, respectively 100 and 50 ppm, recourse having been made successively to the ester of acid phosphate and then to the ammonium salt and finally to the sodium salt.

The control test carried out under the conditions of example 1 provided a loss of weight of 447 g/m².

The recorded results are collected in Table V.

TABLE V

| DOSE (in ppm) | Nature of the alcohol of the ester of acid phosphate used according to the invention | Molar ratio alcohol/P2O5 | Form of the agent (acid or salt) | Loss of weight in 72 h (in g/m²) |
|---|---|---|---|---|
| 100 | n-heptanol | 3 | acid | 3.6 |
| 100 | n-heptanol | 3 | ammonium salt | 3.4 |
| 100 | n-heptanol | 3 | sodium salt | 3.7 |
| 50 | n-heptanol | 3 | acid | 135 |
| 50 | n-heptanol | 3 | ammonium salt | 142 |
| 50 | n-heptanol | 3 | sodium salt | 138 |

It appears from Table V that the efficiency of the alkaline salts is equivalent that of the ester of the acid phosphate.

The latter is however preferred due to the difficulty to handle aqueous solutions of alkaline salts as soon as the concentration in alkaline salt is higher than 40% by weight; as a matter of fact, such solutions are heterogenous.

Consequently and whatever the embodiment, the invention provides an agent and a process to inhibit the corrosive characteristics of nitrogenous fertilizing solutions as well as nitrogenous fertilizing solutions whose characteristics clearly appear from the preceding disclosure and examples, the said agent and process presenting, with respect to those of the prior art, numerous advantages which lie especially in the very low value of the doses of agent which must be used and due to which the thus treated nitrogenous fertilizing solution do not present any salting out of rust even after a prolonged storage.

We claim:

1. Process for inhibiting the corrosive characteristics of a nitrogenous fertilizing solution comprising incorporating in said nitrogenous fertilizing solution at least one of the linear esters of acid phosphates having the formulae:

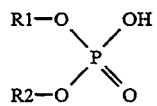

and

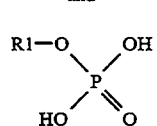

wherein R1 and R2 which are identical or different from one another, are selected from the group consisting of the n-heptyl, n-octyl, n-nonyl and n-decyl radicals, or the alkaline salts of said esters in an amount efficient to prevent the formulation of insoluble deposits in said solution.

2. Process according to claim 1, wherein at least one of the linear esters of acid phosphates of formulae (I) and (II) is incorporated in the nitrogenous fertilizing solution at the moment of its constitution.

3. Process according to one of claims 1 and 2, wherein the amount of at least one of the linear esters of acid phosphates of formulae (I) and (II) is from 50 to 150 ppm.

4. Process according to one of claims 1 and 2, wherein the said esters are in the form of their alkaline salts.

5. Process according to one of claims 1 and 2, wherein the said at least one linear ester of acid phosphates of formulae (I) and (II) comprises from 80 to 20% of monoester of acid phosphate of formula (II) and from 20 to 80% of diester of acid phosphate of formula (I).

6. Process according to one of claims 1 and 2, wherein the said at least one linear ester of acid phosphates of formulae (I) and (II) comprises equivalent proportions of diester of acid phosphate of formula (I) and of monoester of acid phosphate of formula (II).

7. Nitrogenous fertilizing solution having incorporated therein an amount efficient to prevent the formation in said solution of insoluble deposits of at least one of the linear esters of acid phosphates having the formulae:

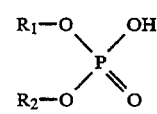

and

-continued

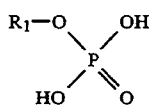
(II)

wherein $R_1$ and $R_2$ which are identical or different from one another, are selected from the group consisting of the n-heptyl, n-octyl, n-nonyl and n-decyl radicals, or the alkaline salts of said esters.

8. Nitrogenous fertilizing solution according to claim 7, wherein the efficient amount of at least one of the linear esters of acid phosphates of formulae (I) and (II) is from 50 to 150 ppm.

9. Nitrogenous fertilizing solution according to claim 7, wherein the said esters are in the form of their alkaline salts.

* * * * *